March 3, 1964  J. S. RODGERS  3,122,933
VARIABLE SPEED PULLEY
Filed May 2, 1962
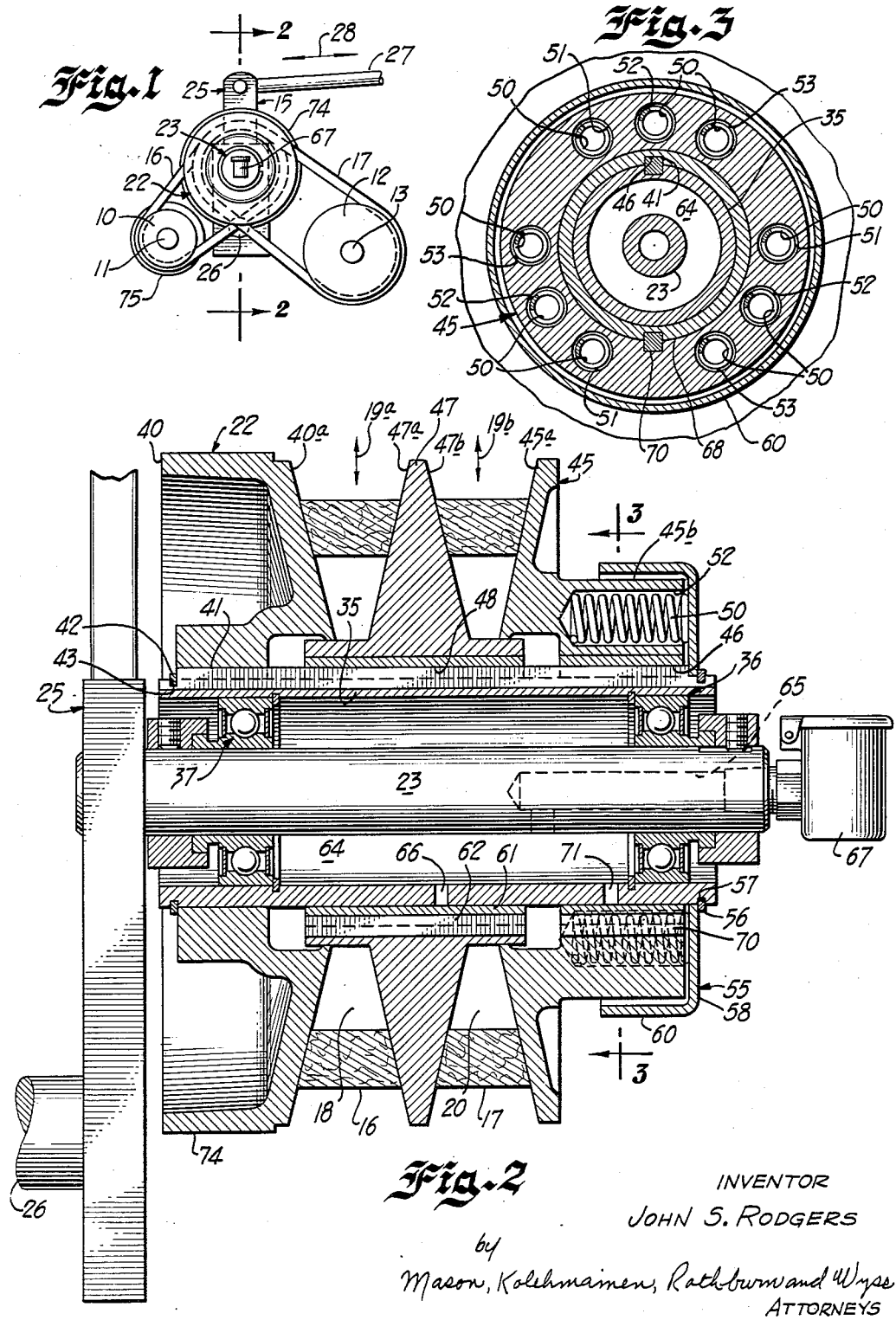
INVENTOR
JOHN S. RODGERS
by
Mason, Kolehmainen, Rathburn and Wyss
ATTORNEYS

United States Patent Office 3,122,933
Patented Mar. 3, 1964

3,122,933
VARIABLE SPEED PULLEY
John S. Rodgers, Racine, Wis., assignor to Devere Company, Racine, Wis., a corporation of Wisconsin
Filed May 2, 1962, Ser. No. 191,837
1 Claim. (Cl. 74—230.17)

The present invention relates to a variable speed pulley and, particularly to a variable drive speed pulley suitable for use on small power equipment such as commercial power lawn mowers and the like.

It is known in the operation and construction of small power equipment to connect the drive shaft of the prime mover to a driven shaft connected to drive the wheels or other device through an idler pulley which is manually adjustable to provide a variable speed selection. One such variable speed pulley is mounted on an axle which in turn is fixed to a pivotally mounted arm to provide for rocking of the axle to provide the selected speed. The variable speed pulley is provided with a pair of end pulley sections movable toward each other and separated by a center pulley section slidably mounted relative to the end pulley section. The center pulley section forms a V-groove with each of the end pulley sections and a first V-belt connected to an output pulley on the prime mover rides in one V-groove while another V-belt drivingly connected to the driven shaft rides in the other V-groove. Rocking of the axle toward one or the other of the driven or driving pulleys will vary the distances between the variable speed pulley and the driven and driving pulley and cause a respective one of the V-belts to move inwardly down one V-groove pushing the center pulley section toward the other of the end pulley sections and causing the other of the V-belts to move outwardly in the V-groove. As this changes the effective diameters of the V-grooves, the speed ratio transmitted by the idling variable speed pulley can be manually controlled.

Heretofore, difficulty has been experienced in biasing the end pulley sections toward each other. It has been common practice to provide a single largely wound helical compression spring concentric with the pulley and biasing the end pulleys toward each other. However, difficulty has been experienced in obtaining a uniform application of pressure and, additionally, in providing for variance of the spring pressure in order to accommodate different size pieces of power equipment.

It is also desirable to provide simple and inexpensive means for reversing power driven equipment such as lawn mowers.

Additionally, difficulty has heretofore been experienced in lubricating and maintaining the bearings of the speed selector pulley on the axle and, further, of the center pulley section thereof.

It is therefore an object of the present invention to provide an improved variable speed pulley which overcomes the aforementioned difficulties.

A further object of the present invention is to provide an improved variable speed pulley.

Yet a further object of the present invention is to provide an improved variable speed pulley of the type heretofore described wherein the force of the end bearing sections relative to each other is uniformly applied and maintained.

Yet a further object of the present invention is to provide a variable speed pulley of the type heretofore described wherein the spring bearing pressure of the end pulley sections relative to each other may be readily changed with a minimum amount of stock parts to adapt the pulleys for differently sized pieces of power equipment.

A further object of the present invention is to provide an improved variable speed pulley of the type heretofore described having an improved system of lubrication.

Further objects and advantages of this invention will become apparent as the following description proceeds and the features of novelty which characterize the invention will be pointed out with particularity in the claims annexed to and forming a part of this specification.

Briefly stated, according to the present invention, the improved variable speed pulley for power equipment according to the present invention comprises a selector arm adapted for pivotal mounting about a pivotal axis on the power equipment. A stud axle is fixed to the arm remote from the pivotal axis and is adapted to be rocked back and forth about the pivotal axis. The stud axle carries a bearing hub which, in turn, carries a fixed end pulley section and an axially slidable end pulley section slidably mounted on the hub relative to the fixed end pulley section in spaced relation thereto. A center pulley section is also slidably mounted on the hub intermediate the end pulley sections for rotation with the hub and the end pulley sections. The center pulley section forms a V-groove with each of the end pulley sections for receiving a respective V-belt. A plurality of compression springs radially positioned remote from the axis of the axle bias the movable end pulley toward the fixed end pulley. The pulley is adapted to be belt driven to provide a variable selectable speed in a first direction, and is further provided with a peripheral driving rim adapted to engage a peripheral frictional drive surface of a cooperating drive wheel or pulley to provide a reverse drive for the power equipment.

In accordance with a particular feature of the present invention, the movable end pulley section is provided with groups of spring-receiving openings so that a selected number of compression springs may be used in a particular speed selector pulley to adapt the particular variable speed pulley for a selected rating of power equipment. The end pulley section may, for example, be drilled selectively to receive three, six, or nine such springs. Accordingly, it is necessary to stock only one size of compression springs to service and adapt the variable speed pulley to various size pieces of power equipment with various power ratings. Additionally, it will be appreciated that the biasing force of the compression springs may be varied on a particular size variable speed pulley by providing for compression of the springs to various amounts.

According to yet another aspect of the present invention, the pulley hub is mounted on the axle through a pair of spaced permanently lubricated ball bearings and the hub is carried by the bearings in coaxial spaced relation to the axle. Moreover, the axle is provided with a generally axially extending oil passageway communicating with the space between the hub and the axle and the hub additionally is provided with an oil passageway means communicating between this space and the bearing surface of the center pulley section to provide for lubricating the bearing surfaces of the center pulley section.

The nature of the invention will best be understood when described in connection with the accompanying drawing, in which:

FIG. 1 illustrates somewhat diagrammatically a driving connection of a piece of power equipment utilizing a variable speed pulley according to the present invention;

FIG. 2 is a cross-sectional view of a variable speed pulley according to the present invention taken along line 2—2 of FIG. 1, and drawn to a larger scale; and FIG. 3 is a cross-sectional end view of the variable speed pulley of FIG. 2 taken along line 3—3 of FIG. 2 drawn to a reduced scale.

Referring now to the drawing, and particularly FIG. 1 thereof, there is illustrated a driving system for a piece of power equipment such as an industrial power lawn mower, and utilizing a variable speed pulley according to the present invention. The driving system includes a drive or output pulley 10 driven by an output or drive shaft 11 of a prime mover (not shown) such as a small horsepower internal combustion engine or electric motor. The drive pulley 10 is operatively connected to drive a driven or load pulley 12 carried by a driven or load shaft 13 which may in turn be connected to drive the wheels and/or cutter of a power lawn mower or other piece of power equipment. A variable speed pulley 15 according to the present invention forms an idler pulley interconnecting the drive pulley and the driven pulley. More specifically, a drive V-belt 16 drivingly interconnects the drive pulley 10 and the variable speed pulley 15. Moreover, a driven V-belt 17 interconnects the variable speed pulley 15 and the driven pulley 12.

As best seen in FIG. 2, the variable speed pulley 15 includes a first or drive belt V-groove 18 and a second or driven belt V-groove 20. The drive V-belt 16 bears against the side walls of the drive belt V-groove 18 and the driven V-belt 17 bears against the side walls of the driven belt V-groove 20, so that the mean or effective diameters of the V-grooves 18 and 20 are represented by the relative distance that the respective one of the V-belts 16 or 17 ride in the respective V-groove 18 or 20. Moreover, it will be appreciated that changing the effective diameters of the V-grooves 18 and 20 relative to each other by moving a first one of the V-belts 16 or 17 inwardly in its groove and thereby forcing the other of the V-belts 16 or 17 outwardly in its groove, as indicated by the arrows 19a and 19b in FIG. 2, will be effective to vary the speed transmitted between the drive pulley 10 and driven pulley 12 through the variable speed pulley 15.

The variable speed pulley 15 includes a pulley portion 22 carried on a stud axle 23 extending from a selector arm 25 intermediate the length thereof. The selector arm 25 is pivotally mounted to a portion of the power equipment through a pivot shaft 26. A variable speed selector link 27 is pivotally connected to an upper portion of the selector arm 25 remote from the pivot shaft 26 so that pushing or pulling of the link 27 as indicated by the doubleheaded arrow 28, FIG. 1, is effective to rock the pulley portion 22 of the speed selector pulley 15 toward and away from the drive pulley 10 and driven pulley 12.

As best illustrated in FIG. 2, the pulley portion 22 includes an elongated cylindrical hub portion 35 rotatably mounted in spaced relation concentrically on the axle 23 by a pair of permanently lubricated spaced ball bearing means 36 and 37. A fixed end pulley section 40 is fixed on the hub portion 35 by a key 41 or other suitable means and is restrained from axial movement relative to the hub portion 35 by a C-ring 42 fitting in an annular groove 43 in the hub portion 35. Accordingly, the end pulley section 40 and hub portion 35 are fixed relative to each other for rotation together.

A second or movable end pulley 45 is slidably mounted at the other end of the hub portion 35 spaced from the end pulley section 40 for slidable movement on the hub portion 35. Moreover, the key 41 extends in a keyway 46 in the movable end pulley section 45 so that the end pulley section 45 rotates with the hub portion 35.

Additionally, the pulley portion 22 includes a center pulley section 47 slidably mounted on the hub portion 35 intermediate the end pulley sections 40 and 45 and keyed against rotation with the hub portion 35 by the key 41 which extends in a keyway 48 in the center pulley section 47. To form the V-grooves 18 and 20, the confronting side surfaces of the end pulley sections 40 and 45 and the center pulley section 47 are inclined outwardly toward the top, as illustrated at 40a, 47a, 47b, and 45a. Consequently, the center pulley section 47 forms the V-groove 18 with the confronting side surface of the end pulley section 40 and additionally forms the V-groove 20 with the confronting side surface of the end pulley 45. It will be appreciated that the center pulley section 47 if slid to the left or right on the hub portion 35 relative to the end pulley sections 40 and 45 will be effective to increase or decrease the size of the V-grooves 18 or 20 and, consequently, to vary the effective relative diameters of the grooves.

In order to bias the end pulley section 45 toward the end pulley sections 40, there is provided a plurality of compression springs 50. To retain the compression springs 50 in a hub section 45b of the end pulley section 45, the hub section 45b is provided in its outer side surface with a plurality of groups of axially extending openings or holes 51, 52, and 53, each group of which consists of three equally spaced openings. The holes in each group are equally spaced angularly relative to each other and radially displaced outwardly from the axle. The number of springs 50 used in a particular variable speed pulley 15 may be selectively varied according to the rated power requirements of the particular power equipment with which the pulley is used, that is, springs may be positioned in selected groups of openings such as one set of springs may be positioned in the openings 52; or two sets of springs may be positioned in openings 51 and 53; or three sets of springs positioned in all of the openings 51, 52, and 53. In this manner by varying the number of springs and by having the hub section 45b pre-drilled to accommodate a selectable number of springs, the variable speed pulley 15 may be adapted to different power requirements while stocking only one size of springs 50 and end pulley sections 45.

In order compressively to retain the springs 50 in the respective ones of the openings 51, 52, or 53, there is provided a generally cup-shaped retaining member 55 positioned on the hub portion 35 and confronting the hub section 45b of the movable end pulley 45 and locked against axial movement by a C-ring 56 fitted in an annular groove 57 in the hub portion 35. The retaining member 55 has a bottom portion 58 bearing against one end of the compression springs 50 and additionally is provided with a flange portion 60 around the hub section 45b. The compression springs 50 are compressed between the bottom portion 58 of the retaining member 55 and the bottom of the respective ones of the openings 51, 52, and 53.

If it is desired to further vary the compressive force obtainable with a single size of compression springs 50, it will be understood that the groups of openings 51, 52, and 53 may be drilled to varying depths, thereby to alter the loading obtainable from the compression springs 50.

According to yet another feature of the present invention, improved lubricating means are provided for the sliding bearing between the center pulley and movable end pulley sections 47 and 45 and the hub portion 35. Specifically, the center pulley section 47 includes a bearing sleeve 61 of suitable material, such as a bronze Oilite bearing, fixed to the remainder of the center pulley section 47 by any suitable means such as a key 62. It will be understood that although the key 41 prevents relative rotation between the center pulley section 47 and the hub portion 35, that the center pulley section 47, as well as the movable end pulley section 45, will move longitudinally relative to the hub portion 35 in response to variations in the selected speed ratio of the variable speed pulley 15. In order to properly lubricate the bearing surfaces of the bearing sleeve 61 and the hub 35, the axle 23 is provided with a generally axially extending oil passageway means 65 communicating with an annular space or chamber 64 formed between the hub portion 35 and the axle 23. Additionally, additional oil passageway means 66 communicate between the space 64 and the bearing surfaces on the bearing sleeve 61. If desired, the open end of the oil passageway 65 may be provided with a conventional oil cup 67 or other suitable oiling means.

The movable end pulley section 45 includes a bearing 68 slidably engaging the hub portion 35. It is understood that the key 41 prevents relative rotation of the bearing 68 on the hub portion 35; an additional key 70 prevents relative rotation between the bearing 68 and the remainder of the end pulley section 45. To properly lubricate the bearing surfaces between the bearing 68 and the hub portion 35, there is provided additional oil passageway means 71 communicating between the space 64 and the bearing surfaces on the bearing 68.

To provide a reverse drive for the power equipment, the variable speed pulley 15 is provided with a peripheral driving rim 74 on the end pulley section 40 which is adapted to frictionally engage a frictional drive surface 75 secured to the drive pulley 10. Movement of the link 27 to the far left as viewed in FIG. 1, is effective first to loosen the drive V-belt 16 to shift the driving system into neutral, and then to drivingly engage the driving rim 74 and the drive surface 75 to shift the power equipment into reverse.

From the above detailed description, the operation of the improved variable speed pulley is believed clear. However, briefly, it will be understood that in forward drive the V-belts 16 and 17 ride on the side surfaces 40a, 47a, and 47b, 45a, respectively of the V-grooves 18 and 20. The height at which the respective belts 16 and 17 ride in the V-grooves 18 and 20 corresponds to the effective diameter of the particular V-groove. Of course, since the variable speed pulley 15 serves an idler pulley interconnecting the drive pulley 10 and the driven pulley 12, the relative effective diameters of the V-grooves 18 and 20 will determine the relative speed of the drive pulley 10 and driven pulley 12. Moreover, as best illustrated in FIG. 1, the variable speed pulley 15 is mounted for rocking movement toward and away from the respective drive and driven pulleys 10 and 12 by actuation of the link 27. It will be appreciated that as the link 27 is moved to the right, as viewed in FIG. 1, that the distance between the drive shaft 11 and the axle 23 of the variable speed pulley 15 will be increased and, accordingly, the drive V-belt 16 will be pulled downwardly toward the bottom of its V-groove 18 as indicated in FIG. 2 by the lower head of the arrow 19a. Such movement of the V-belt 16 toward the bottom of the V-groove 18 will, of course, be effective to widen the V-groove 18 by moving the center pulley section 47 to the right. Movement of the center pulley section 47 to the right will narrow the V-groove 20 and will cause the driven V-belt 17 to rise up relative to the V-groove 20 as indicated by the upper head of the arrow 19b. Accordingly, movement of the link 27 to the right will decrease the effective diameter of the V-groove 18 and increase the effective diameter of the V-groove 20, thereby to increase the speed of the driven shaft 13 relative to the drive shaft 11.

Movement of the control link 27 to the left, as viewed in FIG. 1, will, of course, have the opposite result on the relative effective diameter of the V-grooves 18 and 20 and the relative speed of the drive and driven shafts 11 and 13. Specifically, movement of the lever 27 to the left will be effective to increase the distance between the driven shaft 13 and the axle 23 of the variable speed pulley 15 thereby to cause the driven V-belt 17 to move toward the bottom of the V-groove 20. Movement of the V-belt 17 toward the bottom of the groove 20 will be effective to widen the V-groove 20 and move the center pulley section 47 to the left. Movement of the center pulley section to the left will, of course, narrow the V-groove 18 and cause the drive V-belt 16 to raise upwardly along the sides of the V-groove 18. It is therefore seen that movement of the link 27 to the left is effective to increase the effective diameter of the drive belt V-groove 18 and to decrease the effective diameter of the driven belt V-groove 20, thereby to reduce the relative speeds of the drive and driven shafts 11 and 13.

Continued movement of the control link 27 toward its far left position will be effective to loosen the drive V-belt 16 on the drive pulley 10 and variable speed pulley 15 to place the driving system of the power equipment in neutral gear. Continued movement of the control link 27 to its extreme left position will be effective to shift the driving system of the power equipment into reverse.

Moreover, the plurality of compression springs 50, arranged in one, two, or three groups angularly spaced equally in the hub section 45b of the end pulley section 45, and radially displaced outwardly from the center thereof, are effective to apply a uniform loading to the variable speed pulley 15. Additionally, in the illustrated embodiment, three, six, or nine such springs may be used in one variable speed pulley 15 so that the power rating obtainable from the variable speed pulley 15 may be selected to suit the power requirements of the specific power equipment to which it is attached. The components of the various rated variable speed pulleys are the same size so that only a single stock item of each part must be carried, i.e., by placing compression springs 50 in the holes 52 only, or in the holes 51 and 53 only, or in all of the holes 51, 52, and 53, the rating of the variable speed pulley may be varied while in each case the same size springs 50 may be used. Additionally, if it is necessary or desirable to provide a wider variation in the stock sizes for the variable speed pulley 15, the holes 51, 52, and 53 may be made of various depth to vary the compression of the springs and, accordingly, to vary the rated capacity of the variable speed pulley 15.

Additionally, the variable speed pulley is provided with self-lubricated bearing means on the main bearings for the hub portion 35 on the axle 23, and requiring oil only to the sliding bearing surfaces of the center pulley section 47 and movable end pulley section 45. This provides a variable speed pulley 15 having increased life, not subjected to frequent breakdown due to bearing burnouts.

While a certain preferred embodiment of the invention has been described by way of illustration, many modifications will occur to those skilled in the art. It is intended in the appended claim to cover all such modifications as fall within the true spirit and scope of this invention.

What is claimed as new and desired to be secured by Letters Patent of the United States is:

A variable speed pulley for power equipment comprising a selector arm adapted for pivotal mounting about a pivotal axis on said equipment, a stud axle fixed to said arm remote from said pivotal axis, a pulley hub rotatably mounted on said axle, a first fixed end pulley section fixed to said hub for rotation therewith and provided with an inclined side surface forming one side of a V-groove, a center pulley section slidably mounted on said hub adjacent said opposed inclined side surface for rotation therewith and provided with inclined side surfaces one of which confronts the first-mentioned inclined side surface to form said V-groove and the other of which forms one side of another V-groove, a movable end pulley section slidably mounted on said hub adjacent said other inclined side surface of said center pulley section for rotation therewith and provided with a inclined side surface confronting said other inclined side surface of said center pulley section to form said other V-groove, the last-mentioned pulley section including a hub section provided in its outer side surface with a plurality of groups of holes, the holes in each group being equally spaced angularly relative to each other and radially displaced outwardly from said axle, a retaining member fixed to said pulley hub confronting the last-mentioned side surface, and a plurality of compression springs positioned in selected ones of said groups and compressed between said hub portion and said retainer for continuously biasing said movable end pulley section toward said fixed pulley section.

References Cited in the file of this patent

UNITED STATES PATENTS

| | | |
|---|---|---|
| 2,709,374 | Williams | May 31, 1955 |
| 2,813,433 | Adams et al. | Nov. 19, 1957 |
| 2,900,832 | Snartemo | Aug. 25, 1959 |

FOREIGN PATENTS

| | | |
|---|---|---|
| 19,697 | Great Britain | of 1908 |
| 504,256 | Belgium | July 14, 1951 |
| 764,844 | Great Britain | Jan. 2, 1957 |